C. H. WARNER & A. B. CADMAN.
SPEED INDICATING INSTRUMENT.
APPLICATION FILED MAY 22, 1911.
1,088,948.
Patented Mar. 3, 1914.
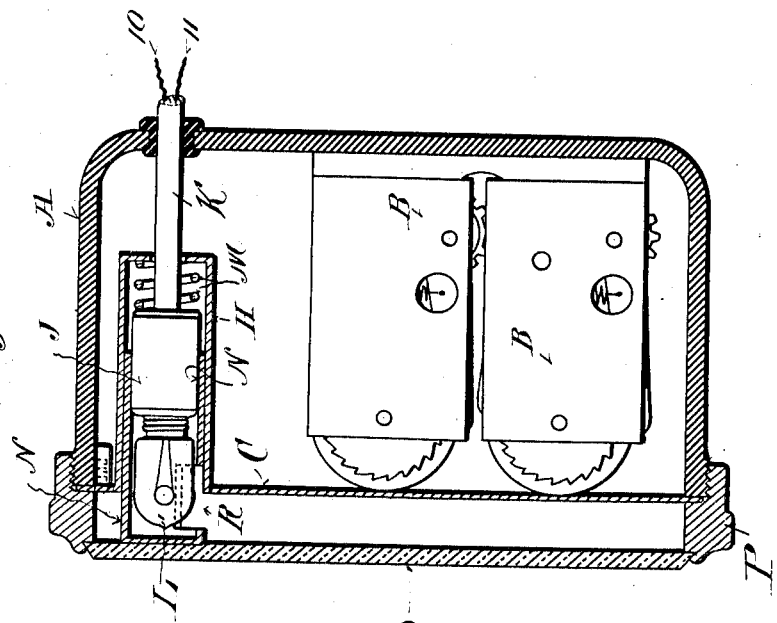
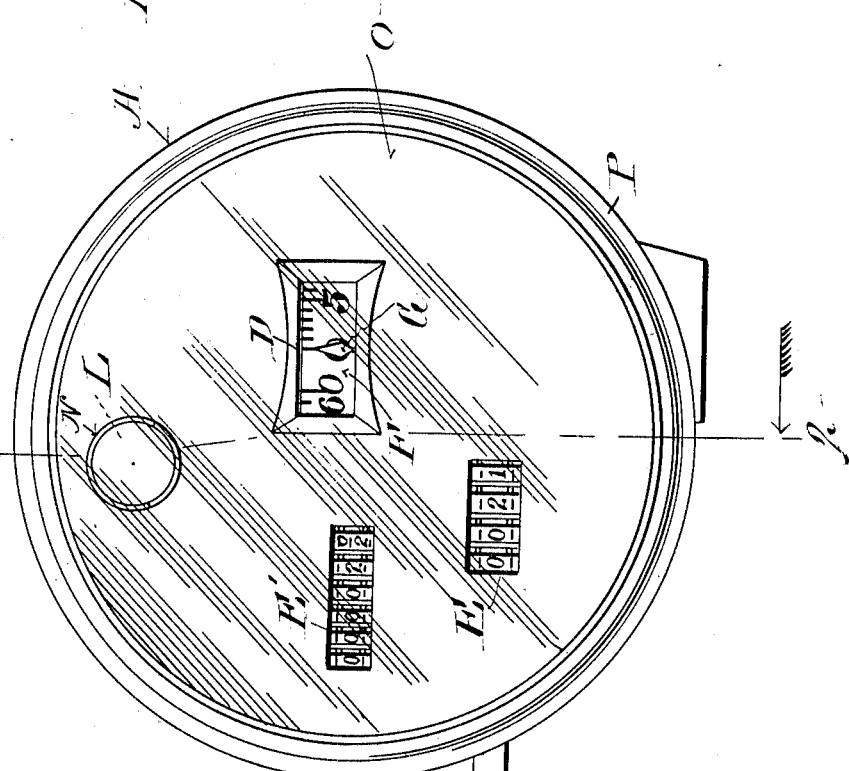

UNITED STATES PATENT OFFICE.

CHARLES H. WARNER AND ADDI BENJAMIN CADMAN, OF BELOIT, WISCONSIN, ASSIGNORS, BY MESNE ASSIGNMENTS, TO STEWART-WARNER SPEEDOMETER CORPORATION, A CORPORATION OF VIRGINIA.

SPEED-INDICATING INSTRUMENT.

1,088,948.     Specification of Letters Patent.     Patented Mar. 3, 1914.

Original application filed January 21, 1909, Serial No. 473,598. Divided and this application filed May 22, 1911. Serial No. 628,712.

*To all whom it may concern:*

Be it known that we, CHARLES H. WARNER and ADDI BENJAMIN CADMAN, both citizens of the United States, residing at Beloit, in the county of Rock, State of Wisconsin, have made a certain new and useful Invention in Speed-Indicating Instruments, of which the following is a specification.

This invention relates to speed indicating instruments and embodies subject matter divided from our pending application Serial No. 473,598, filed January 21st, 1909.

The object of the invention is to provide means which are simple and efficient for illuminating the dials or faces of a speed indicating or measuring instrument.

A further object of the invention is to provide an arrangement of illuminating lamp with reference to the casing of a speed indicating or measuring instrument which is simple, and wherein the lamp is efficiently retained in place, and in such relation as to illuminate the registering or indicating dial or plate or face of the instrument.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Referring to the accompanying drawing:—Figure 1 is a plan view of the face of a speed indicating, or measuring instrument, showing the application and relative location of an illuminating lamp with respect thereto, in accordance with the principles of our invention. Fig. 2 is a view in section of the line 2, 2, Fig. 1, looking in the direction of the arrows.

In the use of speed and distance indicating or registering devices, particularly such devices employed on or in connection with automobiles and other vehicles or movable apparatus, it is desirable to provide means whereby the indicating, or registering dials may be readily read at night or in the dark as well as in the day time. It is among the special purposes of our invention to provide means which are simple and efficient for accomplishing this result, and in the accompanying drawing we have shown an illustrative embodiment of means whereby our invention is capable of being carried into practice.

In the drawing, A designates a casing within which the indicating or registering mechanism is placed. The particular construction and arrangement of indicating or registering mechanism is unimportant, so far as our present invention is concerned, and we have therefore indicated at B, merely an outline of devices for effecting the indicating or registering operation. The casing A is provided with a face plate C, having suitable openings indicated at D, E and E', through which the indicating and registering devices are disclosed. The opening D, in face plate C, is designed to disclose therethrough the speed indicating dial. This dial, in the form shown, is indicated at F, Fig. 1 associated with the pointer G. The openings E and E', disclose the registering wheels therethrough. Extending through the face plate C, and into the chamber of casing A is a barrel H, which is adapted to receive a lamp plug or holder J, provided with a stem K, arranged to extend through the base of the barrel H, and through the casing A, to serve as a carrier for conducting wires 10, and 11, in case an electric lamp is employed.

Adapted to be secured in the lamp plug J, is a lamp L, which, in the particular form shown, comprises an ordinary incandescent electric lamp. It is obvious, however, that other forms and types of electric or other lamps may be employed. Our invention therefore, as defined in the claims, is not to be limited or restricted in this respect. The lamp L, is inclosed within a tube N which is telescoped thereover and into the open end of the barrel H. A spring M, placed within the barrel H and between the closed end thereof and the opposite or adjacent end of the lamp plug J, acts to yieldingly press the plug, and lamp carried thereby outwardly through the open end of the barrel, carrying the inverted telescoped tube endwise therewith.

A glass or other transparent cover O, is provided for the face plate C, so as to disclose the indicating and registering openings D, E and E', therethrough. The outer end of the tube N, bears against the inner surface of the transparent cover O, and is held firmly in place thereagainst by the pressure of spring M, when the ring P, carrying the transparent plate O, is screwed into place on the end of the casing A. In practice the outer end of the tube N, extends outwardly through the cap or face plate C, a sufficient distance to permit the light from the lamp L, to illuminate the outer surface of said face plate. To permit this the tube end is provided with an opening indicated by R, through the side wall thereof. The wall of the tube N, lying opposite the opening R, therein serves as a reflector to reflect the light from the lamp, through the opening R. In practice we prefer to arrange the lamp on one side of the casing A, and to present the opening R, in the side of the tube N, toward the face plate openings D, E and E', as clearly indicated in the drawing.

It will be seen from the foregoing description that the lamp and its inclosing barrel and tube are efficiently supported and maintained and held against vibration or injury under the influence of rough usage to which a motor or other car, vehicle or the like is subject.

Having now set forth the object and nature of our invention and a construction embodying the principles thereof, what we claim as new and useful, and of our joint invention, and desire to secure by Letters Patent is:—

1. In a speed indicating instrument a casing, speed indicating devices inclosed therein and including a movable dial, a face plate arranged to inclose the dial and having an opening to disclose the dial therethrough, a lamp arranged within the casing and extending through the face plate, and means for reflecting the light from the lamp upon the opening in the face plate.

2. In a speed indicating instrument, a casing provided with a face plate having an opening therethrough, indicating devices arranged within the casing to be disclosed through said opening, and a lamp also arranged within the casing and extending through the face plate to illuminate the face plate.

3. In a speed indicating instrument, a casing, speed indicating devices arranged therein, and including an indicating dial and pointer, a lamp carried by the casing, and means for reflecting the light directly from the lamp onto the dial and pointer.

4. In a speed indicating instrument, a casing, speed indicating devices arranged therein and including a dial and pointer, a transparent cap for the casing, a barrel arranged in the casing, a lamp located within the barrel, a tube to inclose the lamp, and a spring tending to force the lamp and its inclosing tube out of the barrel and against the cap, said lamp being arranged to illuminate the dial and pointer.

5. In a speed indicating instrument, an inclosing casing having a face plate, indicating devices arranged within said casing and inclosed by said face plate, and including a dial, said face plate having openings therethrough to disclose said dial, a barrel arranged in said casing, a lamp arranged in said barrel, a tube extending through said face plate, and telescoped over said lamp, said tube having an opening in the side thereof, the opening in the tube being directed toward the opening in said face plate whereby the light from the lamp falls upon the dial disclosed through the opening in said face plate.

6. In a speed indicating instrument, a casing, speed indicating devices arranged therein, and including an indicating dial and pointer, a face plate inclosing said indicating devices, and having an opening therethrough to disclose said indicating dial and pointer, a barrel carried by said casing, a lamp carried by said barrel, a tube telescoped over said lamp and into said barrel, said tube having an opening through the side thereof, the opening in the lamp tube being presented toward the opening in said face plate.

In testimony whereof we have hereunto set our hands in the presence of the subscribing witnesses, on this 13th day of May, A. D., 1911.

CHARLES H. WARNER.
ADDI BENJAMIN CADMAN.

Witnesses:
Wm. R. Burns,
W. A. Rose.